United States Patent [19]

Zwirlein, Jr. et al.

[11] Patent Number: 5,040,728
[45] Date of Patent: Aug. 20, 1991

[54] COMPOSITE VALVING ROD SCRAPER DEVICE AND CARTRIDGE

[75] Inventors: John F. Zwirlein, Jr., New Haven; William F. Rosenplanter, Wallingford, both of Conn.

[73] Assignee: Olin Corporation, Cheshire, Conn.

[21] Appl. No.: 484,603

[22] Filed: Feb. 26, 1990

[51] Int. Cl.⁵ ............................................ B05B 15/02
[52] U.S. Cl. .................................. 239/116; 239/120; 239/123
[58] Field of Search ............... 239/123, 114, 115, 116, 239/117, 120, 112; 222/504, 149, 145, 137, 305, 309, 559, 334

[56] References Cited

U.S. PATENT DOCUMENTS

| | | | |
|---|---|---|---|
| 2,890,836 | 6/1959 | Gusmer et al. | 239/117 |
| 3,144,210 | 8/1964 | Levy | 239/116 |
| 3,334,648 | 8/1967 | Probst | 137/238 |
| 3,687,370 | 8/1972 | Sperry | 239/112 |
| 3,786,990 | 1/1974 | Hagfors | 239/117 |
| 3,876,145 | 4/1975 | Gusmer et al. | 239/112 |
| 3,945,569 | 3/1976 | Sperry | 239/112 |
| 4,003,501 | 1/1977 | Ramazotti et al. | 222/149 |
| 4,377,256 | 3/1983 | Commette et al. | 239/117 |
| 4,427,153 | 1/1984 | Schaefer | 239/117 |
| 4,523,696 | 6/1985 | Commette et al. | 222/135 |

*Primary Examiner*—Andres Kashnikow
*Assistant Examiner*—Lesley Morris
*Attorney, Agent, or Firm*—Ralph D'Alessandro

[57] ABSTRACT

A composite valving rod is provided for use in a foam dispensing apparatus having a low friction material sleeve portion that is retained by scraping surfaces on opposing ends which both maintain the physical dimensions of the plastic sleeve and serve as scraper when drawn through the bore of the foam dispensing cartridge. The cartridge is non-resilient and has at least one elongated groove therein to receive the scraped residual foam.

33 Claims, 3 Drawing Sheets

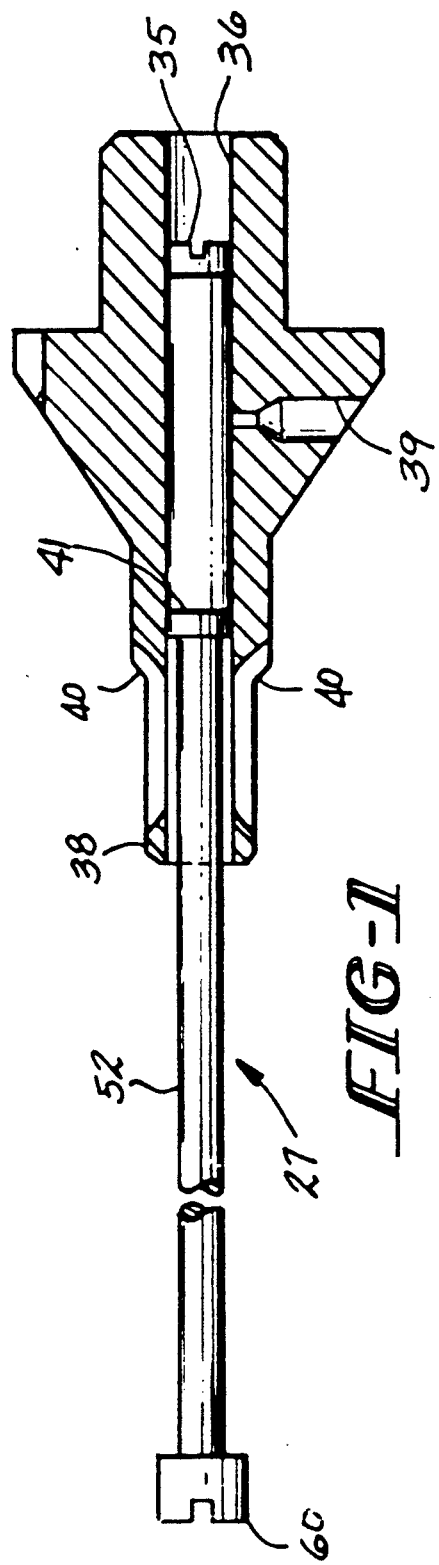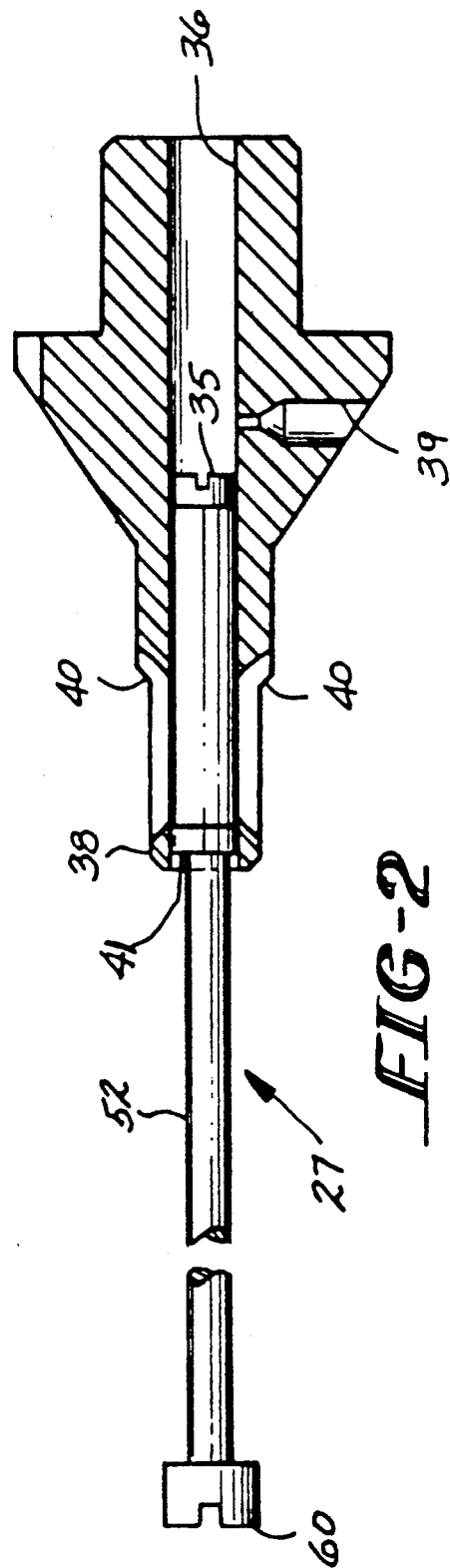

COMPOSITE VALVING ROD SCRAPER DEVICE AND CARTRIDGE

The present invention relates generally to apparatus used to dispense a plurality of liquids through a single orifice, and more particularly it relates to apparatus to prevent and remove built up polyurethane foam from the dispensing orifice of a foam dispenser.

Polyurethane foams are formed by the reaction of an isocyanate component and hydroxyl-bearing compounds. When mixed in the presence of a catalyst, a surfactant, and a blowing agent, these chemicals react to form cellular cross-linked polymer chains, more commonly known as a polyurethane foam. Each of these components of the plural component material, by itself, is generally stable. Thus, each component will not cure or cross-link for extended periods of time, often as long as several months, if they are properly stored. However, when the isocyanate component and the polyol component, a preformulated compound that includes a surfactant, a catalyst and a blowing agent, are mixed together in proper proportions, an exothermic chemical reaction of the isocyanate and polyol occurs. This reaction causes a continued expansion that is evidence of the polymerization and manifests itself as foam which cross-links and cures. The cross-linking and curing usually is substantially completed in a matter of seconds.

Polyurethane foam dispensers are well known and have achieved a high degree of usage in factories where components must be adhesively lined with an insulating foam or where products must be packaged and protected from damage during shipment. This high level of use of polyurethane foam dispensing equipment has also focused attention on the efficiency of prior apparatus employed to accomplish this dispensing. Many of the problems with foam dispensing equipment stem from the fact that the polyurethane foam "sets" or builds up in the dispenser, normally within the mixing chamber or the nozzle, after the chemical components have cross-linked and begun to cure. This "setting" can eventually cause the apparatus to become inoperative due to clogging or blockage of the flow passages.

In operations such as those required during packaging, where intermittent use of the dispensing apparatus is required, the "setting" problem is more severe. This typically occurs in the situation where a packer initially directs a "shot" of the mixed plural components into the bottom of the container, inserts a polyethylene strip over the top, and places the product to be shipped in the container. Another sheet of polyethylene is placed on top of the product, and the foam dispensing apparatus is then activated after a delay of 10 to 20 seconds from the time the first "shot" was dispensed to fill the box with the cushioning foam. This procedure is repeated for each item to be packed.

Prior foam dispensing apparatus has attempted to solve this "setting" problem by using either separately or combinatively air blasts, cleaning rods or plungers cooperative with stationary scrapers, or solvent to remove the residue foam from the dispensing assembly. Specific polyurethane foam systems have attempted to use air with pressurized solvent blown into the mixing chamber and the dispensing nozzle, an automatic solvent flush that runs through the mixing chamber and dispensing nozzle, a blast of purging gas preceding the continuous pumping of solvent through the mixing chamber and dispensing nozzle, and reciprocating cleaning rods or plungers which may or may not use the solvent to facilitate the scraping of residue foam from the dispensing apparatus.

The use of a combination cleaning rod and valving rod to control the flow of the polyol and isocyanate components has proven to be the most common design employed in commercial applications. Since most of the clogging from foam buildup occurs within the mixing chamber or nozzle, designs have evolved employing removable mixing chambers and dispensing nozzle members.

Some designs have employed levers which permit the nozzle or mixing chamber cartridge to be removed from the dispensing gun. Once these components are removed from the dispensing guns, they are frequently soaked in solvent to reduce or remove the residue foam. The solvent, however can attack gaskets or O-ring seals in the components and ruin the tight seals necessary. Alternately the interior of the nozzles can be scored, and therefore ruined when the set up foam is attempted to be removed by reaming with a metal or other abrasive tool.

Other designs have employed a TEFLON® plastic core in the mixing nozzle or cartridge to attempt to reduce foam build-up or facilitate its removal. Metal or other nonresilient material has been used to surround the TEFLON® plastic to overcome cold forming problems that typically result when the core material gradually changes shape under loading to reduce the stress. Cold forming problems affect the tight sealing necessary in interference fittings with the valving rods, thereby permitting the leakage of the isocyanate and polyol components. The mixing nozzle is restrained at each end of the core in both an axial and a radial direction. Another design has employed a detachable mixing chamber and a valving rod as one integral unit.

Alternate approaches have employed an all TEFLON® plastic valving rod with a TEFLON plastic core nozzle and a resilient plastic valving rod sleeve about a metal core reciprocating within a resilient, low friction scraping bushing in an attempt to avoid clogging or freezing up the valving rod within the bore or dispensing orifice of the nozzle. However, these approaches also proved susceptible to cold forming problems.

All of these units with removable mixing chambers suffer from the deficiency of having mixing chambers that are large and costly, or which require the disposal of both the mixing chamber and the valving rod should failure of one component occur. It appeared to be the norm to have TEFLON® or other plastic parts in the stationary nozzle element and metal parts in the moving valving rod.

These problems are solved in the design of the present invention by providing in a plural component dispensing assembly a composite valving rod for use in a dispensing cartridge having a scraper device on the valving rod to remove built up foam from within the bore of the dispensing nozzle during normal operation and an improved cartridge to permit the scraped foam residue to be removed from the mixing chamber.

It is an object of the present invention to provide a valving rod with an improved scraper device that removes built up or "set" foam from the dispensing cartridge's orifice during the normal reciprocation of the valving rod within the bore of the cartridge.

It is another object of the present invention to provide an improved dispensing cartridge that permits the scraped foam residue to be removed from the mixing chamber.

It is a feature of the present invention that the composite valving rod has a low friction plastic sleeve portion that is retained at the rear of the sleeve portion by a second metallic scraper that both maintains the physical dimensions of the plastic sleeve and which serves as a scraper to remove built up foam from the wall of the cartridge bore when drawn through the bore of the dispensing cartridge.

It is another feature of the present invention that the all metal dispensing cartridge has two elongated slots in its tail section with sharp edges that act as static scrapers and permit scraped urethane foam to exit therethrough.

It is an advantage of the present invention that the composite valving rod with the scraper device is low cost, simple in design and easily replaceable.

It is another advantage of the present invention that the wear susceptible component, the composite valving rod, of the dispensing cartridge/valving rod combination is easily replaceable.

It is a further advantage of the present invention that the improved composite valving rod with front and rear scrapers in combination with the cartridge slots extends the operating life of the foam dispensing apparatus.

It is yet another advantage of the present invention that the improved combination composite valving rod with front and rear scrapers and the all metal dispensing cartridge with the slots permits the scraped residual foam to exit from the interior of the bore of the mixing chamber within the cartridge.

It is still a further advantage of the present invention that the improved all metal dispensing cartridge with the slots permits access to the valving rod if the addition of solvent or lubricant is desired.

These and other objects, features and inventions are obtained in the composite valving rod and dispensing cartridge combination employed in the foam dispensing apparatus of the present invention wherein the valving rod employs a low friction plastic sleeve portion that is retained in position by metallic tips or retaining surfaces on both the front and the rear of the sleeve portion which function both as scrapers and maintainers of the physical dimensions of the plastic sleeve during the reciprocating operation of the rod. The all metal dispensing cartridge also has elongated slots adjacent the rear of the cartridge to permit scraped residual foam to exit the bore of the cartridge.

The advantages of this invention will become apparent upon consideration of the following detailed disclosure of the invention, especially when it is taken in conjunction with the accompanying drawings wherein:

FIG. 1 is a cross-sectional side elevational view of the valving rod within the cartridge mixing chamber with the valving rod midway between the fully opened and the fully closed position, preventing or stopping the flow of the plural components into the mixing chamber;

FIG. 2 is a cross-sectional side elevational view of the valving rod within the cartridge mixing chamber with the valving rod positioned in the open position to permit the flow of the plural components into the mixing chamber;

Figure 3:
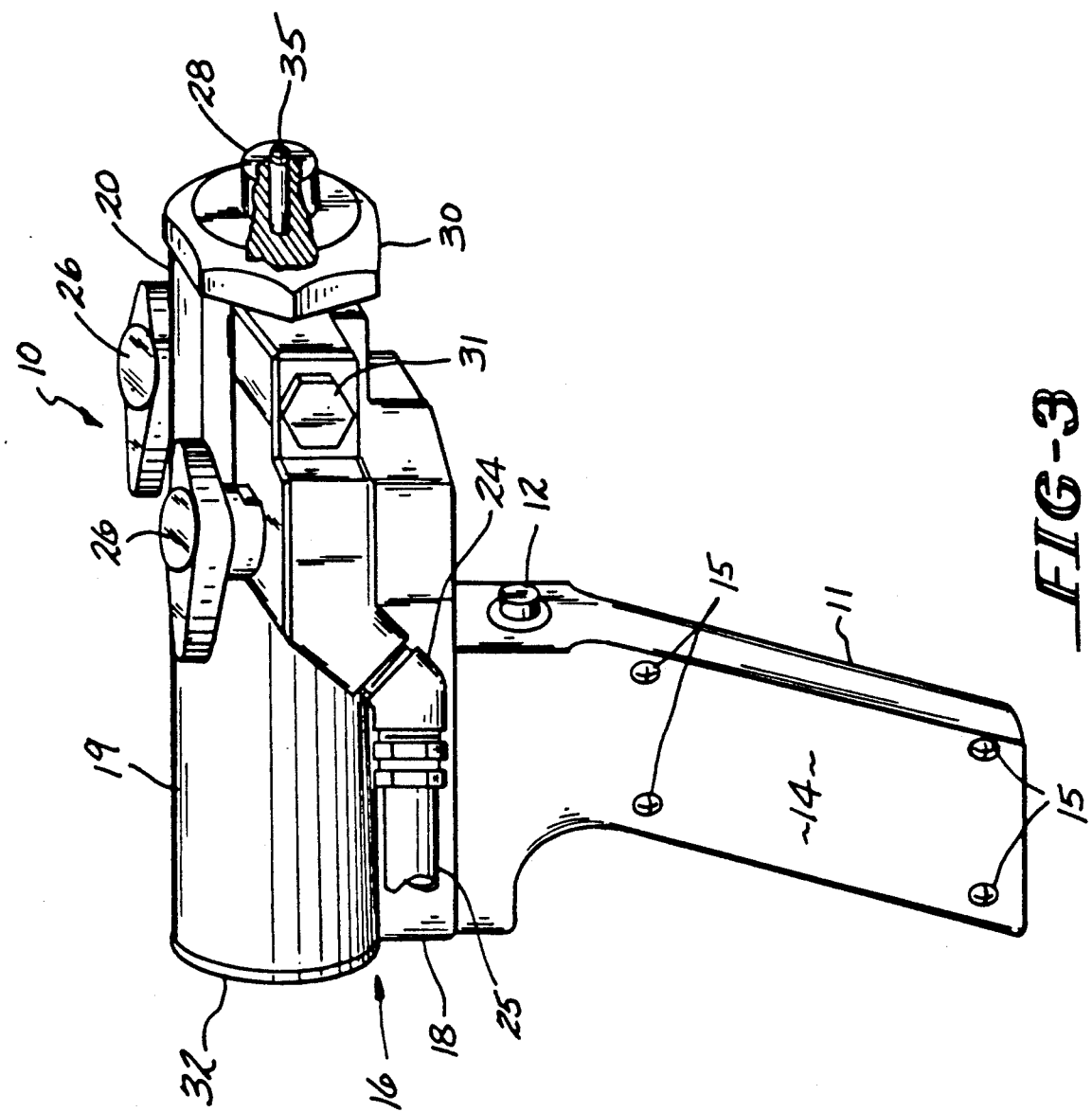
FIG. 3 is a side Perspective view of a plural component dispensing apparatus with a portion of the nozzle broken away and one of the fluid component hoses partially shown employing the dispensing cartridge/valving rod combination of the present invention.

FIG. 3 shows the side perspective view of a plural component dispensing assembly, indicated generally by the numeral 10. Assembly 10 consists of a grip handle 11 and an upper gun portion, indicated generally by the numeral 16. Handle 11 has a trigger 12 which may be an electric trigger switch or an air spool type of a trigger switch to activate the internal mechanisms within the assembly 10 to permit the flow of plural components. Handle side covers 14 may be attached to the handle 11, such as by means of handle side cover retaining screws 15. The handle 11 is appropriately secured to the base 18 of the upper gun portion 16, such as with bolts or mechanically interlocking parts.

The upper gun portion 16 has a cylinder 19 threaded into a valve block 20. A polyol component fitting 24, with the polyol fluid hose 25 (partially shown), feeds into the valve block 20 to supply one of the plural components to the assembly 10. The polyol component passes from the fitting 24 through flow passages in the valve block 20 to the mixing chamber in the bore 36 of cartridge 38, see briefly FIGS. 1 and 2. A plug or shut-off valve 26 seen in FIG. 3, as well as a filter plug cap 31, are used in the polyol component feed Path to control the flow of polyol, as well as to provide access to filter screens (not shown) which remove any impurities from the flow stream. Comparable structures exist on the opposite side of the assembly 10 for the isocyanate fluid component. The nozzle, partially broken away and indicated by the numeral 28 in FIG. 3, is shown protruding through the end of a nozzle retaining cap 30, which is screwed into place to retain the nozzle 28 in position. The front scraper 35 of valving rod 29 is partially seen extending through the nozzle in FIG. 3. The cylinder 19 has an end closure cap 32.

Cylinder 19 has a main body that is generally cylindrical with a diameter size that can be selected according to the task to be performed and the foam output desired. Similarly, the diameter of the valving rod 29 and the length of the nozzle 28 can also be varied. Cylinder 19 has a threaded portion (not shown) which fits within an internally threaded valve block recessed (also not shown) portion. A rod bushing and seal (both not shown) are press fitted within the threaded portion of cylinder 19. Once threaded into the recessed portion, the cylinder 19 is fastened to the valve block 20.

Cylinder 19 has a piston assembly (not shown), that fits inside. The piston assembly is pneumatically driven and includes a hollow or solid cylinder shaft 52 into which is threaded the valving rod 29 on one end. The other end of shaft 52 has the lock knob 60. Shaft 52 has an internally threaded recessed portion 54 which permits the valving rod 29 to seat therein on the opposite end from the lock knob 60.

Figure 4:
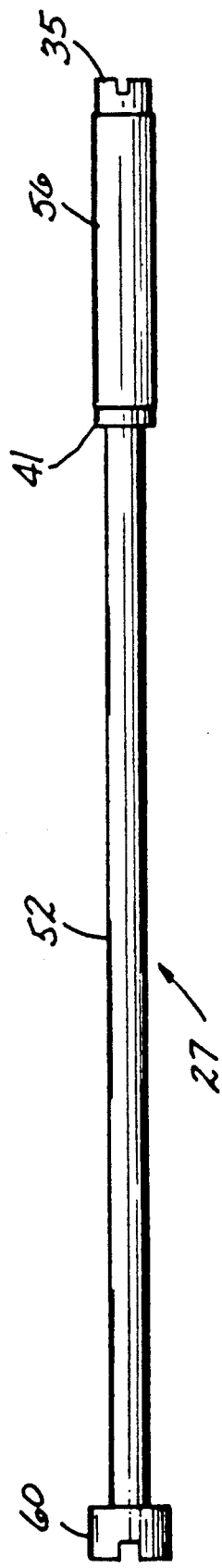
FIG. 4 is a side elevational view of the composite valving rod showing the front and rear scraper devices and the low friction material sleeve portion.
Figure 5:
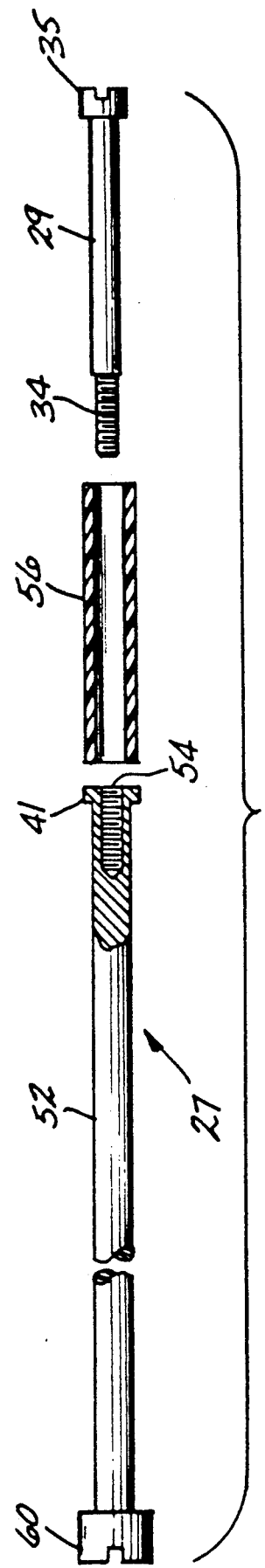
FIG. 5 is a side elevational exploded view of the composite valving rod with the low friction material sleeve and a portion of the central shaft shown in section.
Figure 6:
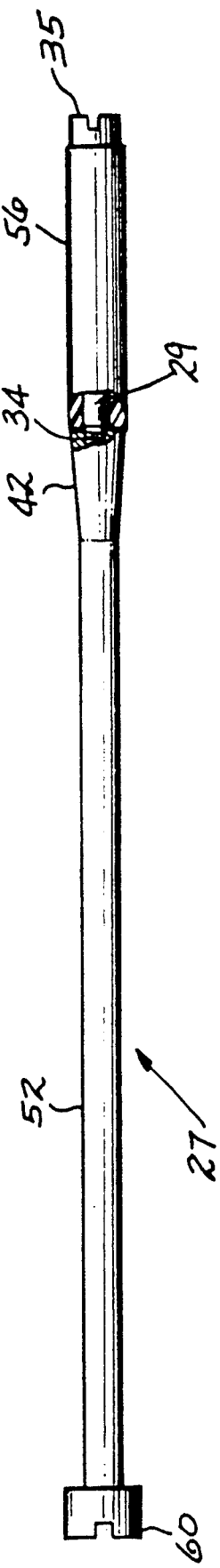
FIG. 6 is a side elevational view of an alternative embodiment of the composite valving rod showing the rear scraper device tapered and a portion of the valving rod and the low friction material sleeve broken away.

The valving rod assembly, indicated generally by the numeral 27 in FIGS. 4-6 has been partially described above. As described, the valving rod assembly 27 includes the shaft 52 and the valving rod 29. Shaft 52 has the end of the internally threaded recessed portion 54 serve as one stop for the low friction material sleeve 56, such as plastic, that fits over the outer dimension or diameter of the valving rod 29. Rod 29 has threaded portion 34 that fits into the hollow internally threaded recessed portion 54 of shaft 52. On the opposing end of valving rod 29 is front scraper 35 that has a larger diameter or outer dimension than the main shaft of valving rod 29, for example by about 0.0675 inches, and serves to retain the low friction plastic sleeve 56 on the opposing end from the hollow recessed portion 54. Sleeve 56 is hollow and fits about the shaft portion of valving rod 29 and is slightly larger in diameter than the scraper stop 35 and the cylinder shaft 52, for example by about 0.0015 inches. The outer diameter of front scraper 35 is only slightly smaller than the inner diameter of the bore 36, for example by about 0.0005 inches, so as to be foam tight, but still slidingly fit within the bore 36.

As seen in FIGS. 4 and 5, valving rod assembly 27 has a second scraping surface or scraper device 41 to the rear of the low friction material sleeve 56. In this embodiment the rear scraper device 41 is slightly smaller in diameter than the cylinder shaft 52. For example, the cylinder shaft 52 can be about 0.182 inches in diameter and the rear scraper device 41 can be about 0.188 inches in diameter. The rear scraper device presents a sharp edge to complement the sharp front edge of front scraper 35.

As best seen in FIGS. 1 and 2, the valving rod assembly 27 with the valving rod 29 and plastic sleeve 56 fits within the bore 36 of cartridge 38. Only one of the two plural component inlet ports is shown. Inlet port 39, when unobstructed by the valving rod 29 and its surrounding plastic sleeve 56, as seen in FIG. 2, permits mixing of the plural components in the mixing chamber portion of bore 36. When the valving rod 29 and its surrounding sleeve 56 are moving forward, as seen in FIG. 1, toward the fully closed position, the flow of plural components is stopped because the inlet ports (only one of which is shown) are blocked.

Cartridge 38, as seen in FIGS. 1 and 2, has at least one elongated slot 40 cut into its rearward portion which presents sharp edges that can catch or scrape residual foam carried by or attached to the valving rod assembly 27 as the assembly 27 reciprocates within bore 36. A plurality of slots 40 is preferred so that the scraped residual foam will exit from the bore 36 and avoid any buildup at the rear of the cartridge 38. Two slots 40 are shown in FIGS. 1 and 2. The elongated slots 40 are located in the rearward or necked portion of the cartridge 38 behind where the plural component inlet ports 39 deliver the plural components for mixing within the bore 36. Slots 40 have tapered opposing ends, each taper preferably being at about 60° and can extend for about 0.4 inches in length. Where two slots 40 are employed, the slots are about 180° apart. One slot may be employed or a plurality of slots greater than two may be employed, as necessary to remove scraped residual foam from the interior of cartridge 38.

It is the reciprocating back and forth movement of the valving rod assembly 27 with its preferably generally cylindrically shaped front scraper 35 and the sharp edge of the rear scraper device 41 that removes any built up or set foam from within the bore 36 in both the forward and rearward movements or strokes of the valving rod assembly 27. The front scraper 35 and the rear scraper device 41 could be any cross-sectional shape, as long as the shape conforms to the cross-sectional shape of the bore 36. The shaft 52 similarly could be any appropriate cross-sectional shape, polygonal or cylindrical.

Since the cartridge 38 is all metal, there are no parts that can cold flow to change the tolerance between the outer diameter of the front scraper 35, the rear scraper device 41, and the sleeve 56 surrounding the valving rod 29.

The low friction material sleeve 56 is retained on opposing ends by the front scraper 35 and the rear scraper device 41. Sleeve 56 can be made from any appropriate low friction type of resilient material such as plastic or fluoropolymer. It preferably is made of a polytetrafluoroethylene plastic, such as that sold under the brand name TEFLON ®. Since this is the component most likely to wear, the valving rod 29 with its sleeve 56 and the hollow shaft 52 can easily be removed and replaced from the gun or plural component dispensing assembly 10.

FIG. 6 shows an alternative embodiment of the composite valving rod assembly 27 that employs a rear scraper device with a ramp 42 that gradually increases in diameter from the diameter of the cylinder shaft 52 to the full diameter of the rear scraper device 41 of FIGS. 4 and 5. The ramp 42 permits the scraped residual foam to move rearward in the bore 36 as the valving rod assembly retracts until the elongated cartridge slots 40 are reached. At this point the residue foam is forced into the slots 40.

Although the plural component dispensing assembly 10 has not been described in detail, it is well known in the art and a further description and the workings of this apparatus is specifically incorporated by reference from the teachings of U.S. Pat. No. 4,708,292, issued Nov. 24, 1987 and assigned to the assignee of the present invention.

While the preferred structure in which the principles of the present invention have been incorporated is shown and described above, it is to be understood that the invention is not to be limited to the particular details thus presented, but in fact, widely different means and structure may be employed in the practice of the broader aspects of this invention. For example, it is to be understood that the instant invention may be equally well employed in a hand held or machine mounted dispensing head. The cartridge 38 could be made of any appropriate non-resilient material, such as ceramic, carbide metal, stainless or carbon steel or other suitable alloys. The scope of the appended claims is intended to encompass all obvious changes in the details, materials and arrangements of parts which will occur to one of skill on the art upon a reading of this disclosure.

Having thus described the invention, what is claimed is:

1. In a plural component dispensing apparatus for the dispensing of a foam formed from the mixing and reaction of plural components, the improvement comprising in combination:
   (a) a mixing chamber having an external periphery and an internal bore of an inner dimension with at least first and second plural component inlet openings and at least one elongated slot opening through the periphery of the mixing chamber rearwardly of the plural component inlet openings and in communication with the bore, the plural component inlet openings being intermediate an outlet end of the bore and the at least one elongated slot; and (b) a valving rod reciprocatingly mounted within the bore to move between a first closed position that prevents the flow of plural components through the at least first and second plural component inlet openings and a second open position that permits such flow, the valving rod further directing residual foam through the at least one elongated slot and having an elongated central portion of a first outer dimension, a first end to the rear of the plural component inlet openings and an opposing second end with a first front scraper device movable from a position to the rear of the plural component inlet openings in the outlet end of the bore, the first front scraper device on the opposing second end being of a size substantially equal to but slightly less than the inner dimension of the bore to slidingly fit within the bore and of substantially the same size as the first outer dimension of the elongated central portion but slightly larger to scrape the bore of residual foam as the rod reciprocates therethrough.

2. The apparatus according to claim 1 further comprising a second rear scraper device adjacent the first end of the valving rod, the second rear scraper device being of a size substantially equal to but slightly less than the inner dimension of the bore serving to scrape residual foam from the inner dimension of the bore and carry it into the at least one elongated slot.

3. The apparatus according to claim 2 wherein the elongated central portion further has a low friction resilient material about at least a portion thereof, the low friction resilient material abutting the opposing second end.

4. The apparatus according to claim 3 wherein the valving rod is connected to a shaft at its first end that is of a size substantially equal to but slightly less than both the inner dimension of the bore and the size of the opposing second scraper device.

5. The apparatus according to claim 4 wherein the second scraper device is connected to the shaft at the end adjacent the valving rod and abutting the low friction resilient material.

6. The apparatus according to claim 5 wherein the low friction resilient material is hollow and fits about the elongate central portion of the valving rod.

7. The apparatus according to claim 6 wherein the low friction resilient material sealingly fits against the at least first and second inlet openings in the first closed Position to prevent the flow of the plural components into the mixing chamber.

8. The apparatus according to claim 7 wherein the opposing second scraper device is generally cylindrical.

9. The apparatus according to claim 8 wherein the low friction resilient material is plastic.

10. The apparatus according to claim 9 wherein the plastic is a fluoropolymer.

11. The apparatus according to claim 7 wherein the mixing chamber has a generally frustoconical intermediate section through which the at least first and second inlet openings extend.

12. The apparatus according to claim 11 wherein the mixing chamber is an all metal cartridge.

13. The apparatus according to claim 12 wherein the at least one elongated slot has opposing tapered ends.

14. The apparatus according to claim 3 wherein the second scraper device is a tapered ramp.

15. A valving rod adapted for reciprocating movement in the bore of a mixing chamber of a plural component dispensing apparatus comprising in combination:

(a) an elongated central shaft section having a first end and an opposing second end, the opposing second end having a first scraper device for scraping mixed residual components from the bore of the mixing chamber during movement in a first forward direction;

(b) a rod section connected at a first end to the opposing second end of the central shaft section adjacent the first scraper device and having an opposing second end; and (c) second scraper means located on the opposing second end of the rod section for scraping mixed residual plural components from the bore of the mixing chamber of the plural component dispensing apparatus during movement in a second opposing direction.

16. The apparatus according to claim 15 further comprising a low friction resilient material that encases the rod section between the scraper means and the scraper device on the opposing second end of the central shaft section, the low friction resilient material being abutted on opposing ends by the second scraper means and the first scraper device.

17. The apparatus according to claim 16 wherein the elongate central shaft section further has a first cross-sectional dimension and the rod section has a second cross-sectional dimension that is less than the first cross-sectional dimension of the central shaft section.

18. The apparatus according to claim 17 wherein the second scraper means and the first scraper device both have a third cross-sectional dimension that is substantially the same size as the first cross-sectional dimension, but slightly larger.

19. The apparatus according to claim 18 wherein the scraper means and the first scraper device are generally cylindrical in shape and have a generally circular cross section.

20. The apparatus according to claim 19 wherein the elongate central shaft section is generally cylindrical in shape and has a generally circular cross section.

21. The apparatus according to claim 20 wherein the rod section is generally cylindrical in shape and has a generally circular cross section.

22. The apparatus according to claim 16 wherein the central shaft section has an internally threaded recessed portion on the opposing second end.

23. The apparatus according to claim 22 wherein the rod section has a threaded portion on the first end that threadingly engages the internally threaded recessed portion on the opposing second end of the central shaft section.

24. The apparatus according to claim 17 wherein the first scraper device is a tapered ramp increasing in cross-sectional dimension from the elongate central shaft section to the opposing second end adjacent the low friction resilient material.

25. The apparatus according to claim 17 wherein the low friction resilient material encasing the rod section is plastic.

26. The apparatus according to claim 25 wherein the plastic is a fluoropolymer.

27. The apparatus according to claim 3 wherein the second rear scraper device adjacent the first end of the valving rod abuts the low friction resilient material opposite the opposing second end of the valving rod.

28. The apparatus according to claim 27 wherein the mixing chamber is non-resilient.

29. A plural component dispensing apparatus for dispensing foam formed from the mixing and reaction in a mixing chamber of plural components whose flow thereinto from inlet openings is controlled by the positioning of a reciprocable valving rod to the front and rear of the inlet openings within a bore in the mixing chamber, the improvement comprising:

opening means on the periphery of the mixing chamber in communication with the bore and cooperative with the valving rod to remove residual foam as the valving rod reciprocates therethrough.

30. The apparatus according to claim 29 wherein the opening means further comprise at least one elongated slot.

31. The apparatus according to claim 30 wherein the elongated slot has scraping means to scrape residual foam carried by or attached to the valving rod into the slot to remove it from the mixing chamber and prevent buildup at the rear of mixing chamber.

32. The apparatus according to claim 31 wherein the valving rod further has a scraper device on an end that moves to the rear of the inlet openings effective to remove residual foam from the bore by directing it into the elongated slot on its movement through the bore to the rear of the inlet openings.

33. The apparatus according to claim 32 wherein the valving rod further has a second scraper on an opposing front end that moves to the front of the inlet openings effective to remove residual foam from the bore through an opening in the front of the bore.

* * * * *

UNITED STATES PATENT AND TRADEMARK OFFICE
CERTIFICATE OF CORRECTION

PATENT NO. : 5,040,728

DATED : August 20, 1991

INVENTOR(S) : Zwirlein, Jr, et al

It is certified that error appears in the above-identified patent and that said Letters Patent is hereby corrected as shown below:

At column 7, line 15, after "openings" delete "in" and insert --to--.

Signed and Sealed this

Twenty-second Day of June, 1993

Attest:

MICHAEL K. KIRK

Attesting Officer     Acting Commissioner of Patents and Trademarks